June 14, 1955 E. M. TYLER 2,710,786
RECORDER WITH AXIALLY RECIPROCATABLE
CYLINDRICAL POSITIVE ELECTRODE
Filed Feb. 15, 1950 2 Sheets-Sheet 1
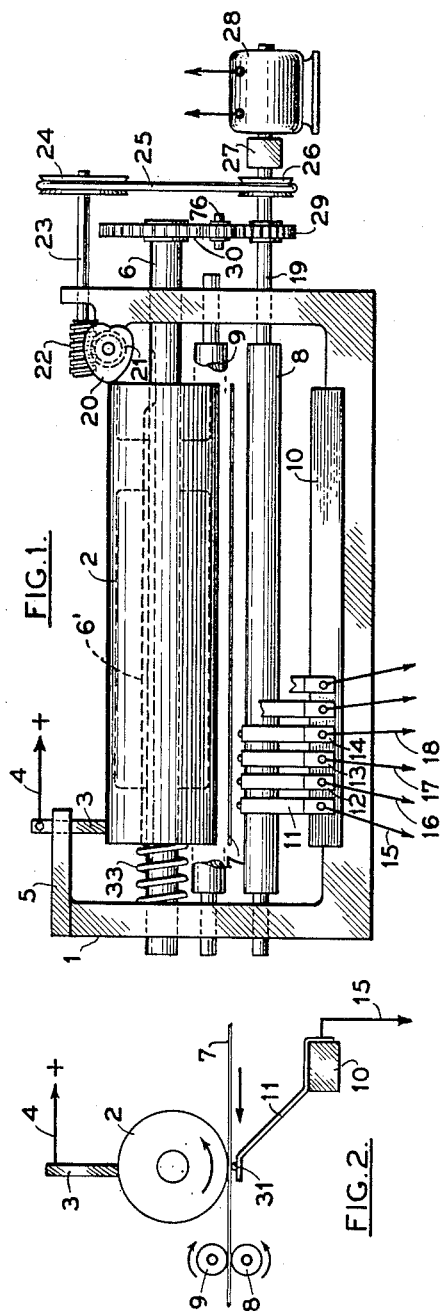
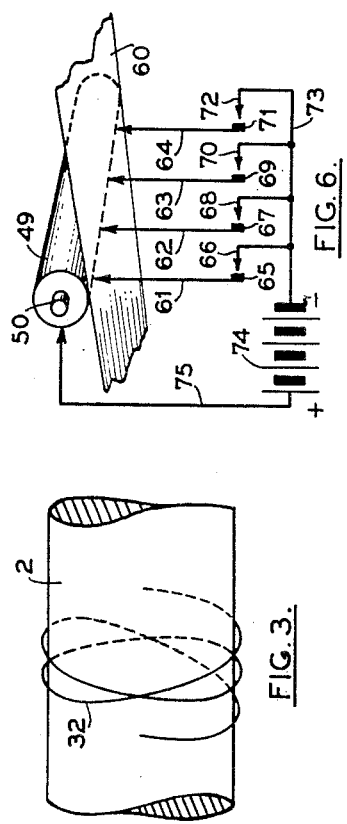
INVENTOR.
EDWARD M. TYLER
BY
Alfred W. Barber
ATTORNEY

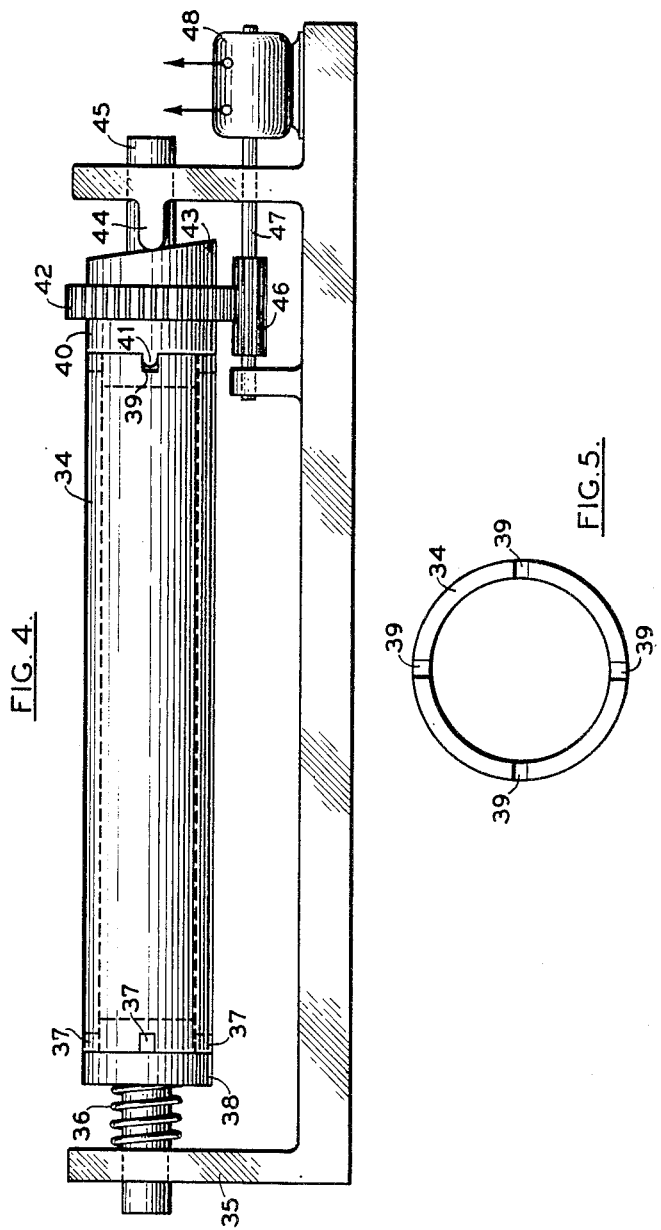

United States Patent Office 2,710,786
Patented June 14, 1955

2,710,786

RECORDER WITH AXIALLY RECIPROCATABLE CYLINDRICAL POSITIVE ELECTRODE

Edward M. Tyler, Chatham, N. J., assignor to Faximile, Inc., New York, N. Y., a corporation of Delaware Application February 15, 1950, Serial No. 144,263

3 Claims. (Cl. 346—74)

The present invention concerns recorders and, in particular, recorders for marking upon electrolytic media.

In the art of electrolytic recording, modulated electric currents are passed between two electrodes through a recording sheet. The recording point is defined by the point of contact between the two recording electrodes through the sheet. In the process of electrolytic recording involved in the present invention, one of the electrodes is dissolved and the metallic particles removed from this electrode are deposited in the recording sheet producing the recording marks. The maximum intensity of the recorded mark appears upon that surface of the recording sheet which is in contact with the positive electrode. It is for this reason that it has become common in the art to speak of the positive electrode as a printing electrode.

Since the positive electrode has hitherto been regarded as a printing electrode it has been chosen to be the one which forms the finest contact with the recording sheet. For instance, in a recorder embodying a helical and linear electrode, the linear or printing electrode has been made positive with respect to the helical electrode. One of the most serious problems in electrolytic recording is due to the fact that the positive or printing electrode is consumed during the process of recording. In the familiar type of recorder embodying helical and linear electrodes, means are provided for readily replacing the linear electrode since it is the one which is consumed during the process of recording.

The problem of electrode wear or erosion is especially severe when it is desired to record lines extending in the direction of paper travel. A stylus is normally employed in recorders of this type as the positive eroding electrode. Due to rapid erosion, the stylus must frequently be replaced. This problem is especially grave in multiple-stylus recorders where there are many styli and where the styli will normally wear at different rates due to the nature of the phenomena being recorded.

According to the present invention the usual procedure in electrolytic recording is reversed in that the positive or printing electrode is a cylinder of relatively large proportions. The effective life of the eroding cylindrical electrode is made very long by rotating it about its axis and the life is further extended by providing for a simultaneous reciprocation of the electorde along its axis.

An object of the present invention is to provide an electrolytic recorder capable of operating over a long period of time without attention.

Another object is to provide a marking or printing electrode having exceedingly long life.

A further object is to provide an electrolytic recorder having a plurality of styli each defining a marking point, the styli not being consumed during the recording process.

A further object is to provide an electrolytic recorder having a marking electrode which is self-cleaning.

These and other objects of the invention will be apparent from the detailed description of the invention given in connection with the various figures of the drawings.

In the drawings:

Fig. 1 is an elevation of a recorder constructed according to the teachings of the present invention.

Fig. 2 is a simplified end view of the recorder shown in Fig. 1.

Fig. 3 is a partial view of the cylindrical recording electrode illustrating the manner in which the wear thereon is distributed over the cylindrical surface.

Fig. 4 is an elevation of a modified form of a portion of the present invention.

Fig. 5 is an end view of the cylindrical marking electrode of Fig. 4.

Fig. 6 is a diagrammatic representation of the recorder and associated electrical circuits.

In Figs. 1, 2 and 3, a frame 1 carries a marking electrode 2 which is in the form of a metal cylinder. For electrolytic recording by the color-lake process, the cylindrical marking electrode 2 will generally be an iron ion bearing electrode and may be made of stainless steel to improve its life. Marking current is applied over lead 4 and through contact brush 3 to the marking electrode 2. Brush 3 is insulated from frame 1 by the insulating arm 5. Cylindrical electrode 2 is mounted on shaft 6 in such a way that it is free to move along its axis but it is forced to rotate with shaft 6. This is accomplished by keyways and key 6'. The recording sheet 7 is drawn through the recorder by drive roll 8 and idler pressure roll 9 in a manner shown to advantage in Fig. 2. Styli 11, 12, 13, 14, etc., are mounted on insulating strip 10 and provide a plurality of recording points on the recording sheet 7. The negative side of a recording current source is connected to styli 11, 12, 13, and 14 over leads 15, 16, 17, and 18. Since these recording styli are not consumed during the recording process they may be of relatively fine and light construction and may be closely spaced in order to provide a large number of recording points on the recording sheet. For example, a recorder may have 100 channels across a recording sheet 8 inches wide. Drive roll 8 is fixed on shaft 19 driven by motor 28 through suitable speed reducing gear box 27. Recording electrode 2 is rotated in the same direction as drive roll 8 through gears 29, 76 and 30 so that recording electrode 2 moves against the motion of the recording sheet, as shown in Fig. 2, and establishes a wiping action which keeps the electrode clean during the recording process. Rotation in the prescribed direction prevents the deposit of "ghost" marks on the recording paper.

In order to distribute the wear on recording electrode 2, it is moved back and forth along its axis by suitable means, such as cam 20 rotated by motor 28 through worm 22, worm wheel 21, shaft 23, pulley 24, belt 25, and pulley 26. As cam 20 is rotated, the cylindrical electrode 2 reciprocates on shaft 6 in a manner determined by the contour of cam 20. Spring 33 maintains the end edge of cylindrical electrode 2 in contact with the cam. The simultaneous rotation and reciprocation of the cylindrical electrode causes the marking point for a single stylus to follow a path represented by the line 32 in Fig. 3. The actual path will depend on the gear ratio between the cylindrical electrode 2 and the cam 20. If the ratio is slightly different from one to one or from one to an integer, the erosion or consumption of electrode 2 will be distributed over substantially the entire cylindrical area.

Fig. 2 shows the relative motions of the drive roll 8, pressure roll 9, the recording electrode 2, and the recording sheet 7. The arrows associated with these parts indicate the various directions of motion. This figure also shows how recording stylus 11 may be provided with a very fine tip 31 defining the recording point on sheet 7.

Fig. 4 shows a modified form of the present invention and for the sake of simplicity only the marking electrode and its driving means are shown. The recording sheet, its driving means and the marking styli are used in the same way as in Fig. 1. The marking electrode 34 is in the form of a hollow cylinder having notches 37 at one end and 39 at the other end. A frame 35 carries the electrode shaft 45 and the electrode itself is held between two end mountings 38 and 40. The end piece 40 is rotated by suitable means such as ring gear 42 turned by pinion 46, which is driven by motor 48 over shaft 47. In order to rotate recording electrode 34, end piece 40 has a projection 41 which fits into one of the notches 39 while its other surface 43 is formed at an angle so that it acts as a cam against projection 44 on frame 35. The return spring 36 keeps cam surface 43 in contact with the projection 44 so that as the recording electrode is rotated it is moved back and forth along its axis. In order to further distribute the wear on electrode 34, it may be relocated from time to time by turning it until another notch 39 is engaged by projection 41. Still further distribution of the wear may be obtained by removing the cylinder 34 and reversing it end-for-end, utilizing notches 37.

Fig. 5 shows an end view of cylinder 34 illustrating an arrangement in which four notches 39 are provided in one end. Similarly four or more notches may be provided in the opposite end. In this way, by utilizing a sufficient number of notches, the wear on the electrode may be well distributed over virtually the entire surface of the electrode to provide an extremely long life. Such an electrode may be operated for hours or even days continuously in each position and its total life may be several weeks.

Fig. 6 diagrammatically shows the recorder and associated electrical circuits. Electrolytic recording paper 60 passes between cylindrical recording electrode 49 and a plurality of styli 61—64. The electrode 49 is rotated and reciprocated on its axle 50. A source of recording current 74 is connected with positive polarity through wire 75 to electrode 49, and in negative polarity through wire 73 and contacts 65—72 to styli 61—64. In operation, the contacts in circuit with each stylus are closed in accordance with a phenomenon to be recorded. When energized, the styli cause continuous black lines to be recorded on the paper 60 extending in the direction of paper travel. This type of operation is possible over extended periods of time by reason of the construction whereby the erosion of the positive electrode is distributed over a large cylindrical area.

While only two forms of the present invention have been shown and described, many modifications will be apparent to those skilled in the art and within the spirit and scope of the invention as set forth in the appended claims.

What is claimed is:

1. In an electrical recorder using electrolytic recording paper, the combination of a cylindrical electrode containing iron, mechanical means for rotating and axially reciprocating said cylindrical electrode, a stationary stylus electrode disposed to cooperate with the cylindrical electrode, means for applying a positive electric charge to said cylindrical electrode and a negative electric charge to said stylus, and paper feed means for drawing recording paper in a fixed path between said cylindrical and stylus electrodes in a direction opposite from that of the paper-contacting peripheral surface of the rotating cylindrical electrode.

2. In an electrical recorder using recording paper, the combination of a rotatable and axially reciprocable cylindrical electrode, a plurality of stationary stylus electrodes disposed to cooperate with said cylindrical electrode, means for maintaining the cylindrical electrode charged with positive electric polarity and maintaining the stylus electrodes charged with negative electric polarity, feed roll means for drawing recording paper in a fixed path between said cylindrical and stylus electrodes, and mechanical means for simultaneously axially reciprocating the cylindrical electrode and rotating the electrode in a direction so that its paper-contacting peripheral surface moves oppositely to the paper travel.

3. A recorder for electrically marking electrolytic recording paper, comprising the combination of a cylindrical electrode containing iron, mechanical means for rotating and axially reciprocating said cylindrical electrode, a stylus electrode disposed to cooperate with the cylindrical electrode, paper feed means for drawing recording paper in a fixed path between said electrodes, and means for applying recording current in positive polarity to said said cylindrical electrode and in negative polarity to the other electrode, whereby erosion of said cylindrical electrode is distributed around its circumference.

References Cited in the file of this patent

UNITED STATES PATENTS

| 859,948 | Kitsee | July 16, 1907 |
| 2,391,912 | Magee | Jan. 1, 1946 |

FOREIGN PATENTS

| 7,222 | Great Britain | of 1896 |